US010019256B2

(12) United States Patent
Somani et al.

(10) Patent No.: US 10,019,256 B2
(45) Date of Patent: *Jul. 10, 2018

(54) SYSTEMS AND METHODS FOR INCREMENTAL SOFTWARE DEVELOPMENT

(71) Applicant: PayPal, Inc., San Jose, CA (US)

(72) Inventors: Mahesh K. Somani, Milpitas, CA (US); Kumar Rethinakaleeswaran, San Jose, CA (US); Debashis Saha, San Jose, CA (US); David William Dodd, Los Gatos, CA (US); Suresh Mathew, Sunnyvale, CA (US)

(73) Assignee: PayPal, Inc., San Jose, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 14/925,446

(22) Filed: Oct. 28, 2015

(65) Prior Publication Data

US 2016/0048391 A1 Feb. 18, 2016

Related U.S. Application Data

(63) Continuation of application No. 14/477,664, filed on Sep. 4, 2014, now Pat. No. 9,201,632, which is a
(Continued)

(51) Int. Cl.
*G06F 9/44* (2018.01)
*G06F 8/71* (2018.01)
(Continued)

(52) U.S. Cl.
CPC ............ *G06F 8/71* (2013.01); *G06F 8/30* (2013.01); *G06F 8/41* (2013.01); *G06F 9/44* (2013.01); *G06F 11/368* (2013.01)

(58) Field of Classification Search
CPC ....................................................... G06F 8/71
(Continued)

(56) References Cited

U.S. PATENT DOCUMENTS 5,170,465 A 12/1992 Mckeeman et al.
5,182,806 A 1/1993 McKeeman et al.
(Continued)

OTHER PUBLICATIONS

Tu, Qiang. "Evolution in open source software: A case study." Software Maintenance, 2000. Proceedings. International Conference on. IEEE, 2000. pp. 131-142.*
(Continued)

*Primary Examiner* — Satish Rampuria
(74) *Attorney, Agent, or Firm* — Maschoff Brennan

(57) ABSTRACT

Methods and systems for facilitating incremental software development are disclosed. For example, a method can include receiving a plurality of binary software libraries sufficient for building a software project. A request from a user to modify source code for at least one of the plurality of binary libraries is received. In response to receiving the request, the source code for the at least one of the plurality of binary libraries is retrieved. The source code for the at least one of the plurality of binary libraries is presented to the user. Modified source code for the at least one of the plurality of binary libraries is received. The modified source code is compiled to produce compiled modified code. A revised version of the software project is built using the compiled modified code and the plurality of binary libraries.

13 Claims, 9 Drawing Sheets

Related U.S. Application Data continuation of application No. 13/164,410, filed on Jun. 20, 2011, now Pat. No. 8,856,724.

(51) Int. Cl.
*G06F 8/30* (2018.01)
*G06F 8/41* (2018.01)
*G06F 11/36* (2006.01)

(58) Field of Classification Search
USPC .................................................. 717/101–126
See application file for complete search history.

(56) References Cited

U.S. PATENT DOCUMENTS

| | | | | |
|---|---|---|---|---|
| 5,193,191 | A | * | 3/1993 | McKeeman ............... G06F 8/71 717/162 |
| 5,519,866 | A | | 5/1996 | Lawrence et al. |
| 5,561,800 | A | | 10/1996 | Sabatella |
| 5,758,160 | A | | 5/1998 | McInerney et al. |
| 5,764,989 | A | | 6/1998 | Gustafsson et al. |
| 5,769,114 | A | | 6/1998 | Ko |
| 5,848,274 | A | | 12/1998 | Hamby et al. |
| 6,052,531 | A | | 4/2000 | Waldin, Jr. et al. |
| 6,564,368 | B1 | * | 5/2003 | Beckett ..................... G06F 8/34 717/102 |
| 6,651,249 | B2 | * | 11/2003 | Waldin ..................... G06F 8/64 717/168 |
| 6,728,951 | B1 | * | 4/2004 | Gibson ..................... G06F 8/71 717/162 |
| 7,185,332 | B1 | | 2/2007 | Waldin et al. |
| 7,287,249 | B2 | | 10/2007 | Coyle et al. |
| 7,434,200 | B2 | | 10/2008 | Bender |
| 7,457,817 | B2 | | 11/2008 | Krishnaswamy et al. |
| 7,506,115 | B2 | * | 3/2009 | Xing .................... G06F 11/1435 711/162 |
| 7,574,706 | B2 | | 8/2009 | Meulemans et al. |
| 7,721,272 | B2 | | 5/2010 | Mockford |
| 7,797,689 | B2 | | 9/2010 | Mockford |
| 8,856,724 | B2 | | 10/2014 | Somani et al. |
| 9,201,632 | B2 | | 12/2015 | Somani et al. |
| 2004/0268308 | A1 | * | 12/2004 | Srivastava ............ G06F 11/368 717/120 |
| 2004/0268309 | A1 | | 12/2004 | Grover et al. |
| 2004/0268327 | A1 | * | 12/2004 | Burger ..................... G06F 8/20 717/140 |
| 2005/0166094 | A1 | | 7/2005 | Blackwell et al. |
| 2006/0080680 | A1 | * | 4/2006 | Anwar ................ G06F 9/44521 719/328 |
| 2007/0234320 | A1 | | 10/2007 | Gu |
| 2009/0055809 | A1 | | 2/2009 | Campbell et al. |
| 2009/0070750 | A9 | | 3/2009 | Gu |
| 2009/0271760 | A1 | | 10/2009 | Ellinger |
| 2010/0242032 | A1 | | 9/2010 | Ladki et al. |
| 2011/0119653 | A1 | | 5/2011 | Culpepper et al. |
| 2012/0324417 | A1 | | 12/2012 | Somani et al. |
| 2014/0380271 | A1 | | 12/2014 | Somani et al. |

OTHER PUBLICATIONS

Zimmermann, Thomas, et al. "Cross-project defect prediction: a large scale experiment on data vs. domain vs. process." Proceedings of the the 7th joint meeting of the European software engineering conference and the ACM SIGSOFT symposium on The foundations of software engineering. ACM, 2009. pp. 91-100.*
Gousios, Georgios, Eirini Kalliamvakou, and Diomidis Spinellis. "Measuring developer contribution from software repository data." Proceedings of the 2008 international working conference on Mining software repositories. ACM, 2008. pp. 129-132.*
"U.S. Appl. No. 13/164,410, Response filed Aug. 13, 2013 to Non Final Office Action dated May 15, 2013", 15 pgs.
"U.S. Appl. No. 13/164,410, Response filed Dec. 19, 2013 to Final Office Action dated Sep. 19, 2013", 12 pgs.
"U.S. Appl. No. 13/164,410, Examiner Interview Summary dated Nov. 27, 2013", 3 pgs.
"U.S. Appl. No. 13/164,410, Final Office Action dated Sep. 19, 2013", 17 pgs.
"U.S. Appl. No. 13/164,410, Non Final Office Action dated Feb. 13, 2014", 22 pgs.
"U.S. Appl. No. 13/164,410, Non Final Office Action dated May 15, 2013", 16 pgs.
"U.S. Appl. No. 13/164,410, Notice of Allowance dated Jun. 4, 2014", 15 pgs.
"U.S. Appl. No. 13/164,410, Response filed May 8, 2014 to Non Final Office Action dated Feb. 13, 2014", 11 pgs.
"U.S. Appl. No. 14/447,664, Response filed Jun. 26, 2015 to Non Final Office Action dated Mar. 26, 2015", 11 pgs.
"U.S. Appl. No. 14/477,644, Examiner Interview Summary dated Jun. 5, 2015", 3 pgs.
"U.S. Appl. No. 14/477,664, Non Final Office Action dated Mar. 26, 2015", 17 pgs.
"U.S. Appl. No. 14/477,664, Notice of Allowance dated Jul. 29, 2015", 19 pgs.
"U.S. Appl. No. 14/477,664, Preliminary Amendment filed Sep. 5, 2014", 7 pgs.
Benediktsson, Oddur, "COCOMO-based effort estimation for iterative and incremental software development", Software Quality Journal 11.4 (2003), (2003), 265-281.
Benediktsson, Oddur, "Incremental Software Development", (2005), 1-30.
Boehm, Barry W, "A spiral model of software development and enhancement", Computer 21.5, (1988), 61-72.
Mohagheghi, Parastoo, et al., "Effort Estimation of Use Cases for Incremental Large-Scale Software Development", Software Engineering, 2005. ICSE 2005. Proceedings. 27th International Conference on. IEEE,, (2005), 9 pgs.
Ottenstein, Karl J, et al., "The program dependence graph in a software development environment", ACM Sigplan Notices. vol. 19. No. 5. ACM, (1984), 177-184.

* cited by examiner

SYSTEMS AND METHODS FOR INCREMENTAL SOFTWARE DEVELOPMENT

PRIORITY CLAIM

This application is a continuation of prior U.S. application Ser. No. 14/477,664, filed on Sep. 4, 2014, which is a continuation of U.S. application Ser. No. 13/164,410, filed on Jun. 20, 2011, each of which is incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyright rights whatsoever. The following notice applies to the software and data as described below and in the drawings that form a part of this document: Copyright 2011, eBay Inc. All Rights Reserved.

TECHNICAL FIELD

This application relates generally to software development and, more specifically, to systems and methods for the incremental development of large-scale software projects.

BACKGROUND

As both the speed and functionality of computer systems increase, along with the size and capacity of their corresponding program and data storage devices, the size and complexity of software applications or projects executing on such systems continue to follow a similar trend. To develop a typical large-scale application, such as an online commercial service website, a large team of software developers working in parallel to generate the application is often employed, along with a testing group to ensure that the resulting software performs according to a predefined set of functionality, reliability, and performance specifications.

To allow the software developers to generate their specific portions of the project concurrently, each member of the development team often possesses access to an integrated development environment (IDE) to facilitate the development and testing tasks. In some implementations, an IDE is an integrated set of software tools often including a source code editor to allow a developer to write and edit one or more source code "modules" or files in a programming language of choice, a compiler to transform the written source code into machine-level instructions understandable by the computing processor or platform on which the application is to be executed, and a linker to link the various compiled modules together so that the resulting application may be executed on the chosen platform. In some cases, the IDE may also include build automation tools that allow the development team to automate the compilation, linking, and other tasks normally associated with generating the resulting executable binary image. The IDE may also include a debugger to aid the developer in ascertaining the cause of problems or errors associated with execution of the application.

Even with the functionality normally provided by an IDE, the initial generation of source files, along with a workable compilation and linking environment, is typically difficult and time-consuming, even if the development project is based on a preexisting application. Further, even once the initial set of modules is generated and verified, incremental changes to the existing modules, and the addition of new modules, by a developer may often introduce problems or faults to the overall application that impede the progress of other developers.

BRIEF DESCRIPTION OF THE DRAWINGS

Some embodiments are illustrated by way of example and not limitation in the figures of the accompanying drawings in which.

DETAILED DESCRIPTION

Example methods and systems for incremental software development are discussed. The systems and methods for developing software, in some example embodiments, may involve use of a development environment in conjunction with one or more additional systems. In the following description, for purposes of explanation, numerous specific details are set forth in order to provide a thorough understanding of example embodiments. It will be evident, however, to one skilled in the art that the present subject matter may be practiced without these specific details. It will also be evident that the types of software development described herein are not limited to the examples provided and may include other scenarios not specifically discussed.

Example Software Development System and Method

Figure 1:
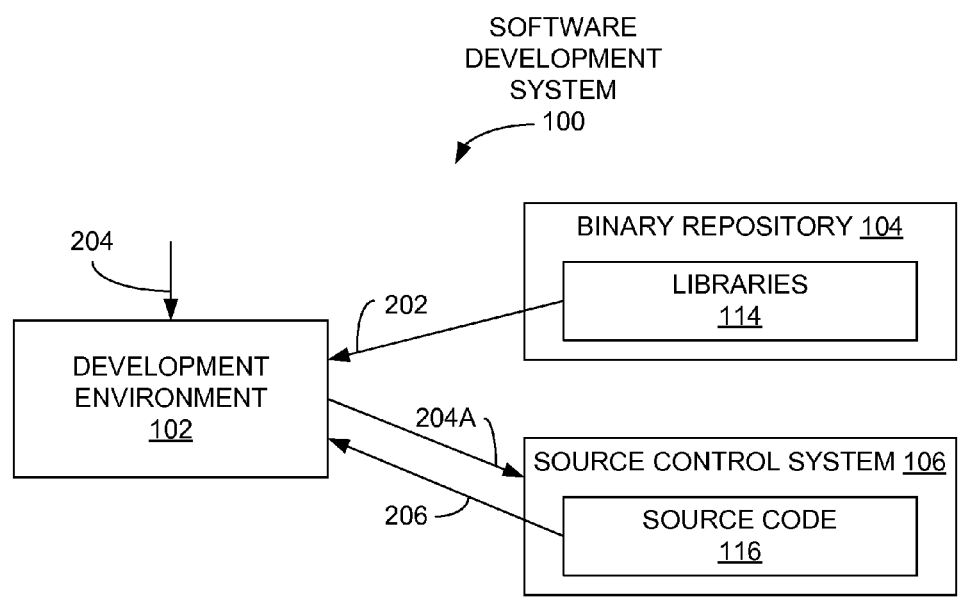
FIG. 1 is a block diagram illustrating an example software development system.

In accordance with an example embodiment, FIG. 1 illustrates a software development system 100 including a development environment 102, a binary repository 104, and a source control system 106. FIG. 1 is annotated with references to at least some of the operations discussed below in conjunction with FIG. 2. In one example, the development environment 102 allows a user, such as a software developer, to write and modify source code 116, such as software written in a particular programming language (for example, C, C++, C#, JAVA programming language, and the like). The source control system 106 stores source code 116 for one or more software applications or projects, while the binary repository 104 stores one or more binary libraries 114 for the applications. Each library 114 is a compiled binary representation of some portion of the source code 116, wherein each library 114 may be linked with other libraries 114 and/or other binary code to form an executable software image that may be loaded onto a computer or other processing system for execution.

Figure 2:
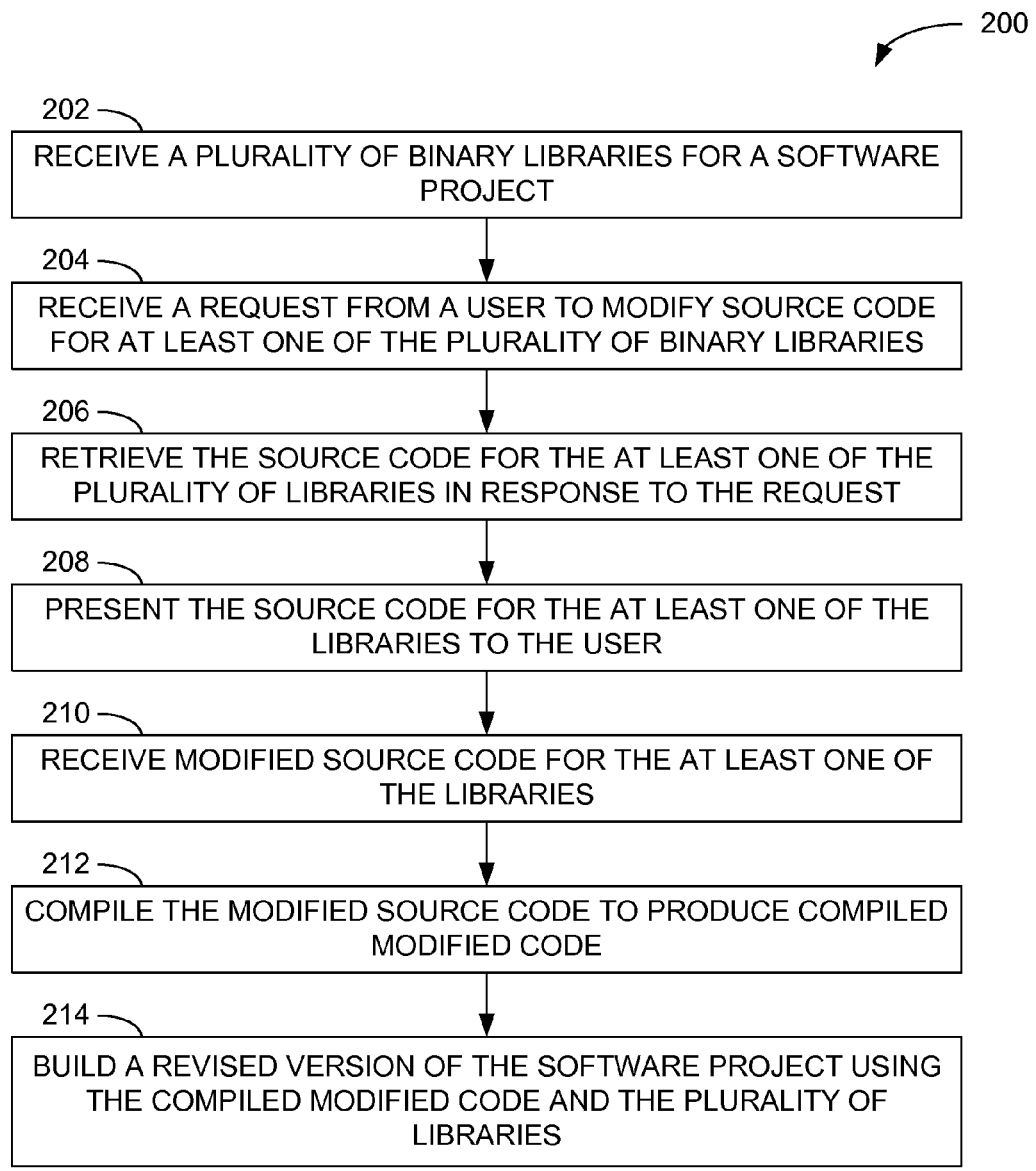
FIG. 2 is a flow diagram illustrating an example method for software development using the system of FIG. 1.

FIG. 2 illustrates a flow diagram of a method 200 for software development in reference to the software development system 100 of FIG. 1. However, other software development systems utilizing different components or systems may employ the method depicted in FIG. 2 in other examples. In the method 200, a plurality of binary libraries sufficient for building a software project is received by the development environment 102 from the binary repository 104 (operation 202). A request is received from a user to modify source code 116 for at least one of the plurality of binary libraries 114 (operation 204). As shown in FIG. 1, the user request results in a request for the source code 116 that may be forwarded as a source code request 204A from the development environment 102 to the source control system 106. In response to the user request of operation 204, the source code 116 for the at least one of the plurality of libraries 114 is retrieved from the source control system 106 into the development environment 102 (operation 206). The retrieved source code 116 may take the form of one or more source files that may be edited by the user. The development environment 102 may present the received source code 116 to the user (operation 208), who may then modify the received source code 116, such as by way of the development environment 102. Upon receiving the modified source code (operation 210), the development environment 102 (or another system not specifically shown in FIG. 1) may compile the modified source code to produce compiled modified code (operation 212) and build a revised version of the software project using the compiled modified code and the plurality of libraries 114 (operation 214).

In another example, the method 200 may be encoded as instructions on a non-transitory computer-readable storage medium, such as, for example, an integrated circuit, magnetic disk, or optical disk, which are readable and executable by one or more computers or other processing systems.

In employing the method 200, access to source code 116 at the development environment 102 may be limited to those portions of source code 116 that a developer is interested in modifying. The updated version of an application or project may then be built by compiling the modified source code and linking the resulting compiled code with previously-generated binary libraries 114. As the binary libraries 114 are more compact than their associated source code, the storage and communication bandwidth requirements of the development environment 102 are reduced when compared to development systems in which the project is built using all of the original source code. Other example software development systems and methods are described below.

Other Example Software Development Systems and Methods

Figure 3:
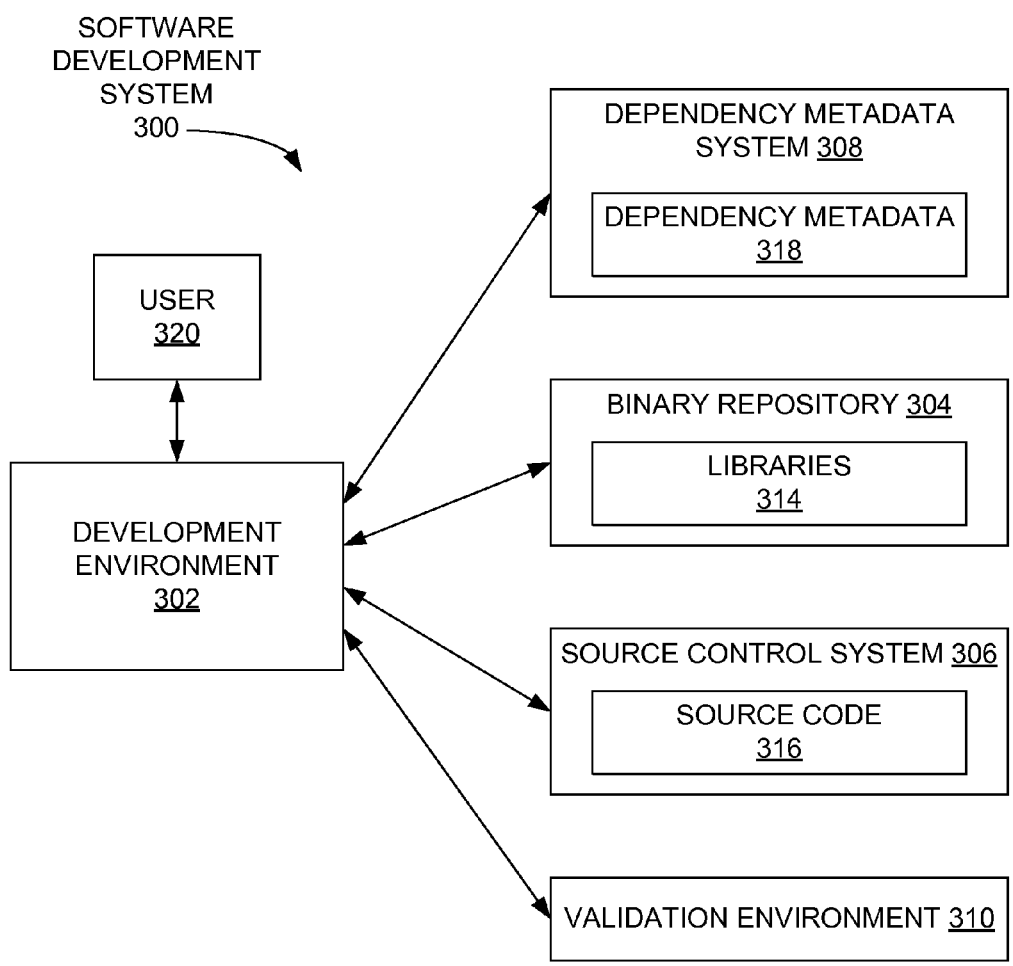
FIG. 3 is a block diagram illustrating another example software development system.

FIG. 3 depicts a software development system 300, including a development environment 302, a dependency metadata system 308, a binary repository 304, a source control system 306, and a validation environment 310. Each of the components 302, 304, 306, 308, 310 of the software development system 300 may reside on separate computer systems, incorporated into a single computer system, or apportioned among a plurality of computer systems in some other manner. In other systems, one or more of the components 302, 304, 306, 308, 310 may be omitted.

In one embodiment, the development environment 302 facilitates the writing and modification of source code, such as one or more source files or modules written in a particular programming language, such as, for example, C, C++, C#, or JAVA programming language, by way of a source code editor. The writing or modification may be based on instructions received from a user 320, such as a software developer. The source code may then be compiled to generate one or more binary files that may be linked or combined with other binary files to produce or build a desired application or program. In one example, the development environment 302 may be an integrated development system (IDE) that incorporates a number of other tools for the benefit of the user. These tools may include, but are not limited to, a source code compiler, a linker, a debugger, and one or more build automation tools.

Communicatively coupled with the development environment 302 is a dependency metadata system 308 configured to maintain dependency metadata 318, or to at least provide access thereto. In one embodiment, the dependency metadata 318 includes information that determines which code elements, such as source files and binary libraries, are to be included for a particular project or application, which source files are to be compiled before linking, and the like. In another example, the dependent metadata 318 may also include information regarding which versions of each library or source file should be included in a build to form a particular version of the application. Such version information may be associated with a particular "checkpoint" identifying the code or application version. In one example, the checkpoint is associated with a particular feature, functionality, or performance level (such as, for example, a version that is known to have passed a number of verification tests) associated with the resulting application version.

In one embodiment, the dependency metadata 318 may include information useful for "pre-build" activities (such as, for example, checking for the presence of all libraries and source files to be included for the build, verifying the correct versions of such files, converting source files from one language to another before compilation, and checking for a sufficient amount of data storage space in which to perform the build), and "post-build" activities (for example, checking of the resulting application to ensure that the correct version was built, and running of one or more verification tests on the application). In another example, the dependency metadata 318 may be incorporated within the development environment 302 or one of the other components 304, 306, 310 of the software development system 300.

Also communicatively coupled with the development environment 302 may be a binary repository 304, which maintains, or provides access to, multiple binary libraries 314. In one example, each of the libraries 314 includes machine-language binary code generated from the compilation of one or more source files or modules. Examples of a library 314 may include, but are not limited to, a static library, a dynamically-linked library (DLL), and a bytecode file for a JAVA Virtual Machine (JVM). The binary repository 304 may also include multiple versions of the same library 314 that are intended to be used for different projects, or for different versions or checkpoints of the same project. As is described in greater detail below, the libraries 314 of the repository 304 may be organized in a hierarchy so that a library 314 may be associated with more than one application or project.

Another system coupled with the development environment 302 may be a source control system 306 containing or providing access to source code 316. Generally, the source control system 306 tracks and controls changes to the source code 316 made by multiple users 320. In some embodiments, the source control system 306 may be referred to as a version control system (VCS) or a revision control system (RCS). The source code 316 may be embodied as multiple source files or modules that may be modified or revised by the user 320 locally in the development environment 302. In one example, the source code 316 may be stored in the source control system 306, and/or transmitted to the development environment 302, as one or more compressed files, such as ZIP files. To gain access to the source code 316 of interest, the user 320 may "check out" one or more source files for retrieval and modification in the development environment 302. In one example, while the source files are checked out, the user 320 that checked out the source files is the only user that may modify those files to prevent parallel changes being made to the same source code file. After the desired modifications are made, the user 320 may then "check in" the modified source code to allow other users to access the modified source code. In one example, the source control system 306 maintains older versions of each source file so that the user 320 may return to an older version of one or more of the source files to eliminate errors introduced into the application by a more recent modification to the source code 316.

Also included in the software development system 300 of FIG. 3 is a validation environment 310 that may perform any number of tests on an application to validate various aspects of the application. Such tests may include, in one embodiment, unit tests (to test a particular portion or unit of the application), compatibility tests (to verify the compatibility of the application with some predefined standard), performance tests (to measure execution speed, response time, latency, and the like, for example), and/or regression tests (to test the functionality or performance of the application that was verified in a previous version of the application). Such testing may be performed in response to modified source code 116 being checked into the source control system 306, according to some predetermined schedule, or in response to some other input or stimulus, such as from the user 320. As described more fully below, the validation environment 310 may perform or initiate other functions, such as test result notification and library 314 generation, depending on the results of one or more of the tests being performed in the validation environment 310. As the validation environment 310 is separate from the development environment 302, the validation of one or more code versions may proceed in parallel with source code development occurring in the development environment 302.

Figure 4A:
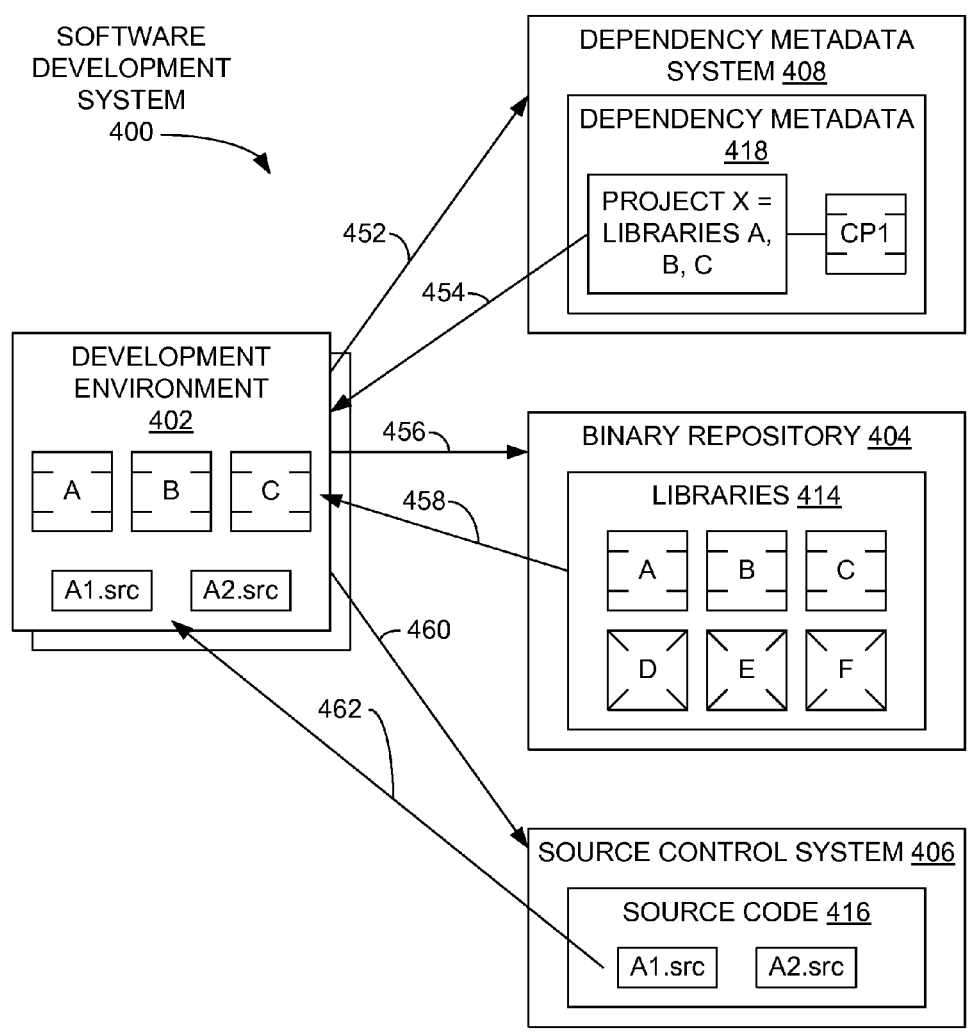
FIG. 4A is an annotated block diagram of an example software development system illustrating a first portion of an example method for software development.
Figure 5A:
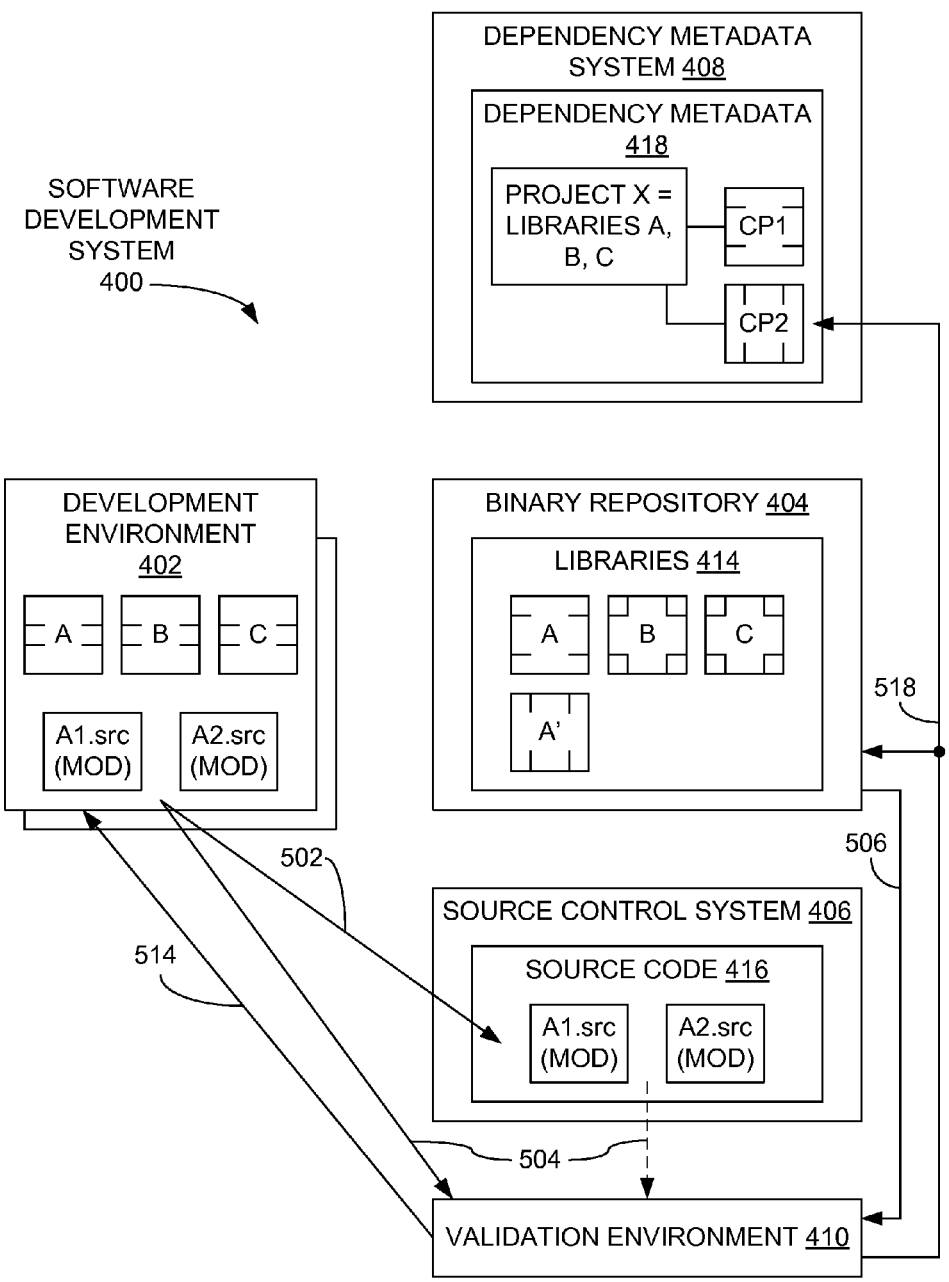
FIG. 5A is an annotated block diagram of the system of FIG. 4A illustrating a second portion of the example method for software development.

A block diagram of an example software development system 400, including one or more development environments 402, a dependency metadata system 408, a binary repository 404, and a source control system 406, is presented in FIG. 4A. A validation environment 410 is also included in the system 400 (as shown in FIG. 5A), but is not explicitly depicted in FIG. 4A to simplify the following discussion. Each of the components 402, 404, 406, 408, 410 of the software development system 400 may provide functionality similar to their counterpart components 302, 304, 306, 308, 310 of the software development system 300 described above in conjunction with FIG. 3. In one example, each developer for one or more software projects may be associated with a separate development environment 402 to allow each of the developers to work concurrently.

Figure 4B:
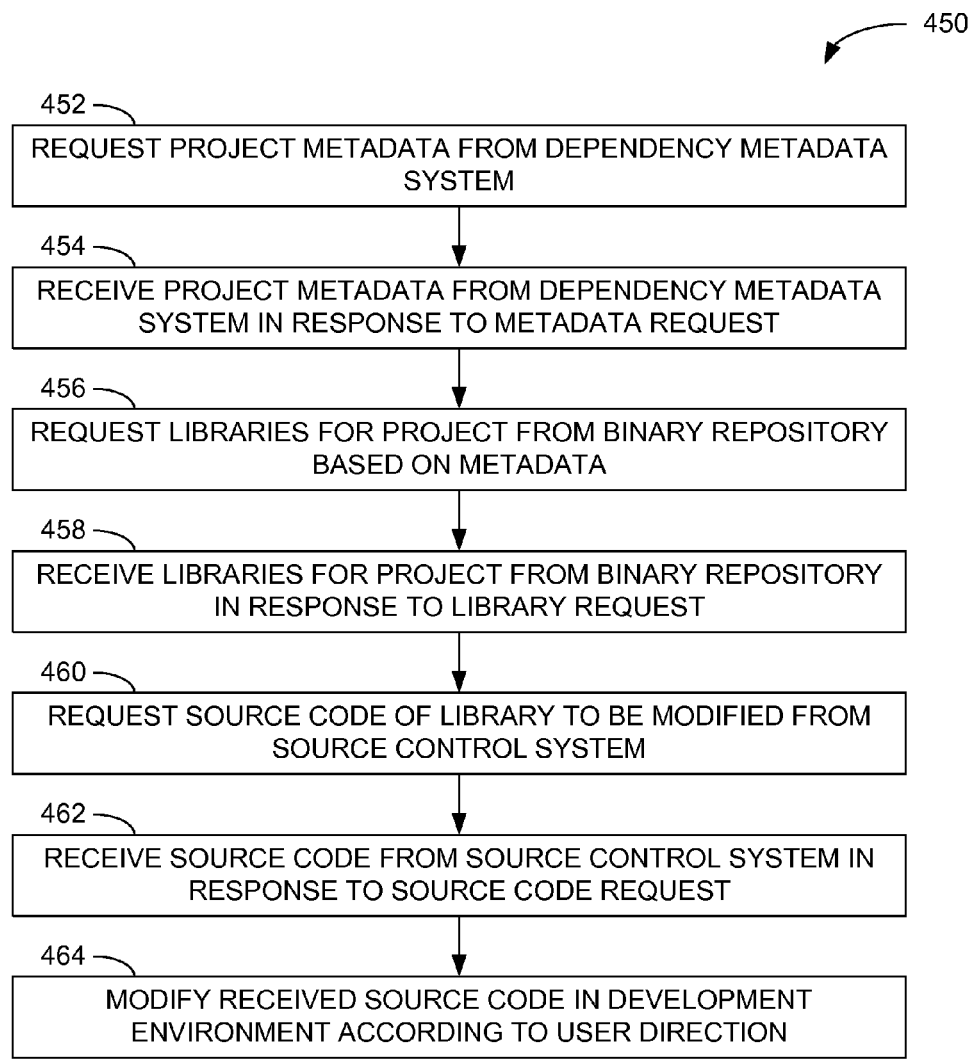
FIG. 4B is a flow diagram illustrating the first portion of the example method depicted in FIG. 4A.

FIG. 4B illustrates a first portion 450 of a method of facilitating incremental software development using the software development system 400 of FIG. 4A. In such an environment, small incremental changes in the source code 416 of an application are the typical process by which the application is developed. In one example, the initial code for a particular project is provided solely by a set of binary libraries 414 residing in the binary repository 404 for a previous project. In other examples, during subsequent phases of the development of the project, the compiled code modules are reincorporated into one or more libraries 414 from time to time and stored in the binary repository 404, thus reducing the amount of source code 416 that is accessed and downloaded to the development environment 402.

In the first portion 450 of the method of FIG. 4B, the development environment 402 requests dependency metadata 418 for a particular project from the dependency metadata system 408 (operation 452). In the example presented in FIG. 4A, the desired project is labeled "Project X". In response to the request, the dependency metadata system 408 returns the metadata 418 associated with Project X (operation 454). According to the dependency metadata 418 associated with that project, binary libraries A, B, and C are sufficient to build the project. As a result, in one example, the dependency metadata 418 aids in identifying only those libraries 414 of the repository 404 that are needed for the Project X build, thus preventing the development environment from also downloading additional libraries 414 that are unnecessary for the project of interest. In one example, the dependency metadata 418 is also associated with a previously set checkpoint, labeled CP1. In this case, the checkpoint CP1 may indicate that the version of the libraries A, B, and C associated with the checkpoint CP1 represent a functionally stable revision of the project available to various developers working on the project. As shown in FIG. 4A, the checkpoint CP1 and the libraries A, B, C associated with the checkpoint CP1 are marked with horizontal line segments to distinguish that version of the libraries A, B, C with libraries associated with other checkpoints. As described above, the dependency metadata 418 may include other data for pre-build activities, post-build activities, and other activities or purposes.

After the development environment 402 receives the dependency metadata for Project X (operation 454), the development environment 402 requests the libraries 414 referenced in the dependency metadata 418 from the binary repository 404 (operation 456). The request may include the identity of the desired libraries 414, including a version number or other identifier to distinguish between different versions of the same library 414. As depicted in FIG. 4A, the binary repository 404 includes the desired libraries 414 for Project X, as well as additional libraries D, E, F for one or more other projects. As shown, the additional libraries D, E, F are associated with a different checkpoint by way of the diagonal line segments marking those libraries D, E, F.

To aid in verifying that the correct versions of the desired libraries A, B, C are indeed the ones being retrieved from the repository 404, the dependency metadata 418 may include some unique identifier for each library 414 that is based on the actual content of the library 414. In one example, a hash value computed from the content of the library 414, such as, for example, MD5 (Message-Digest algorithm 5), may be included in the dependency metadata 418 and compared with a hash value either stored in the binary repository 404, or computed by either the repository 404 or the development environment 402, to verify the identity of the library 414.

Other embodiments may employ any of a wide variety of hash values or other unique identifiers generated from the content of the libraries 414.

After the libraries A, B, C associated with the first checkpoint CP1 for Project X are downloaded into the development environment 402 (operation 458) in response to the request for the libraries A, B, C, the project may be built and executed on the development environment 402 in one example. Typically, the user of the development environment 402 may desire to alter the source code 416 associated with one or more of the libraries A, B, C to improve or alter the operation of the project in some way. In the specific example of FIG. 4A, the user indicates via the development environment 402 that modification of a couple of source components A1, A2 associated with the library A is desired. In one example, the components A1, A2 are separate source files that have been compiled and combined to form at least a portion of the library A. In response to the user request, the development environment 402 issues a request to the source control system 406 for the source components A1, A2associated with the library A (operation 460). In response to receiving the request from the development environment 402, the source control system 406 returns the requested source code 416 (operation 462), which in this case is contained in two files: A1.src and A2.src.

In one example, the source control system 406 maintains older versions of each source file. As a result, the request for the source code 416 from the development environment 402 may include some indication as to the version of the source files to be retrieved, such as the checkpoint identifier CP1 for the current project revision.

After the desired source files A1.src, A2.src are received at the development environment 402, the developer accessing the development environment 402 may modify the source files A1.src, A2.src (operation 464), possibly via a source code editor providing a graphical user interface (GUI) to facilitate the modifications. In an embodiment, the development environment 402 may monitor the changes made to the source files A1.src, A2.src to determine if any incompatibilities exist between the modifications and the libraries A, B, C to which the compiled versions of the source files A1.src, A2.src are to be linked. For example, the developer may modify A1.src to change the number of input parameters received by a particular procedure or method defined therein. As a result, any calls to that procedure from any of the libraries A, B, C associated with the current project will need to be modified as well, or else compilation and/or linking errors will result during a subsequent project build. To that end, the development environment 402 may inform the developer of any interface incompatibilities or other potential compilation or linking problems caused by the source code modifications, as well as identify the particular libraries A, B, C and/or corresponding source code involved. Further, the development environment 402 may retrieve the impacted source code 416 from the source control system 406 in response to the modifications, or in response to approval of the developer. In one implementation, the development environment 402 notifies the developer of the incompatibilities as soon as the developer has made the corresponding modifications to the source files A1.src, A2.src. In another example, the development environment 402 notifies the developer of the incompatibilities once the modifications to the source files A1.src, A2.src have been completed or saved.

The developer may also initiate a build of the project using the modified source files A1.src, A2.src, as well as perform any number of tests, in the development environment 402. To this end, the development environment 402 may use the dependency metadata 418 for the current project that was retrieved earlier from the dependency metadata system 408, possibly including the current checkpoint CP1. In one embodiment, when performing a build, the development environment 402 is structured such that the modified source files A1.src, A2.src are compiled to generate their associated binary components before the earlier versions of those components residing in the previously downloaded library A are linked as part of the build, thus ensuring that the newer modified components are employed.

Figure 5B:
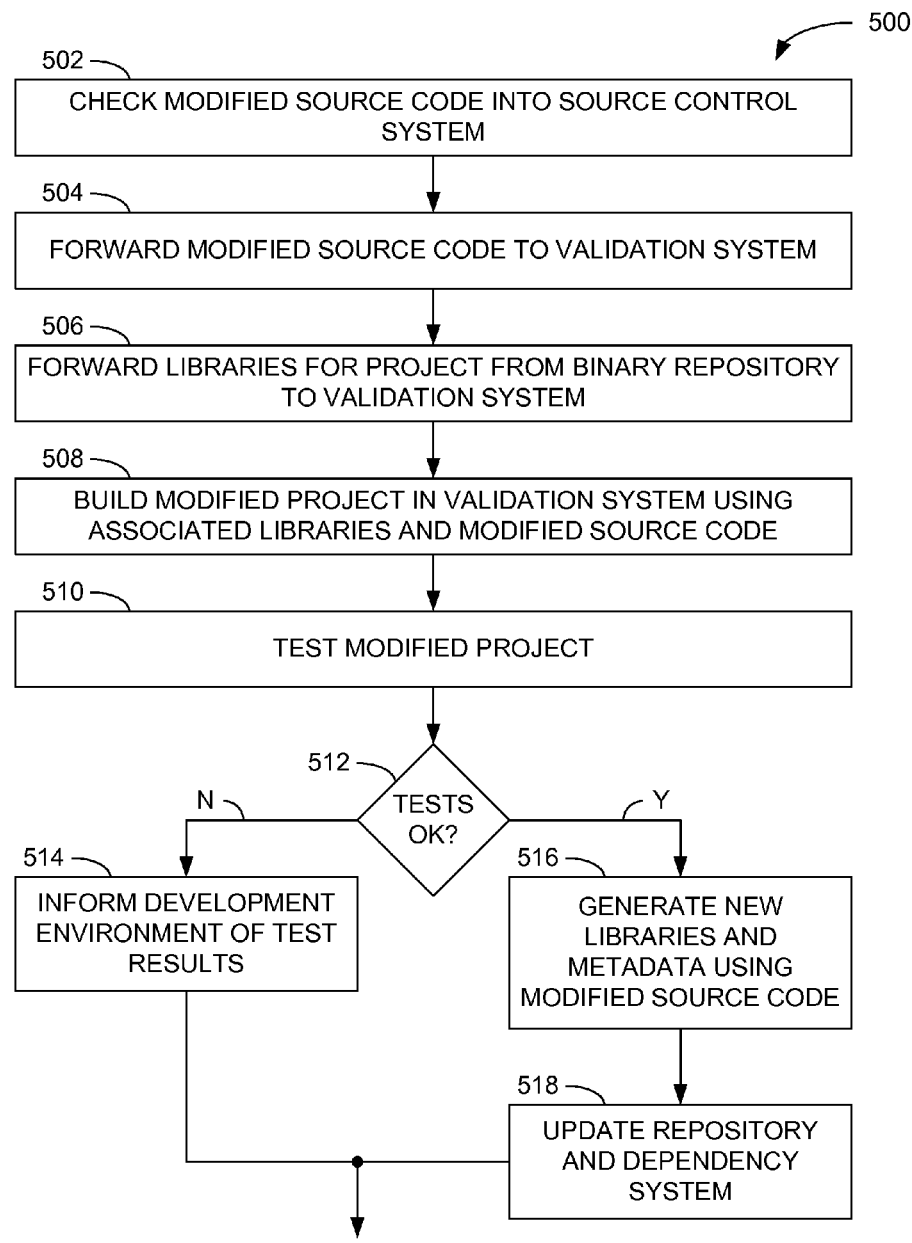
FIG. 5B is a flow diagram illustrating the second portion of the example method depicted in FIG. 5A.

FIGS. 5A and 5B depict the software development system 400 as a result of execution of a second portion 500 of the method for facilitating incremental software development. After the developer has modified the source files A1.src, A2.src in the development environment 402 (operation 464 of FIG. 4B), the developer may check-in the modified source files (labeled A1.src (MOD) and a2.src (MOD) in FIG. 5A) into the source control system 406 (operation 502). The same modified source files may also be forwarded by either the development environment 402 or the source control system 406 to the validation environment 410 (operation 504). The validation environment 410 may then build the project by compiling the modified source files A1.src (MOD), A2.src (MOD) and linking them with the binary libraries A, B, C associated with the checkpoint CP1 (operation 508). In one example, the validation environment 410 accesses the dependency metadata 418 associated with the current project to perform the build and other associated activities. In one embodiment, the validation environment 410 may perform a build for each of multiple projects if the modified source code A1.src (MOD), A2.src (MOD) affects multiple projects, as indicated by the dependency metadata 418. If the build is not successful, the validation environment 410 may inform the developer via the development environment 402 of the problem so that the developer may further modify the source code 416 to remedy the discovered problems.

Instead, presuming that each project build in the validation environment 410 was successful, the validation environment 410 may then conduct one or more tests on the resulting projects (operation 510), possibly including, but not limited to, unit tests, compatibility tests, performance tests, and regression tests, as discussed above. If any of the tests (or at least some of the more important tests) are unsuccessful (operation 512), the validation environment 410 may inform the user via the development environment 402 of the errors or faults encountered during its testing of the revised projects (operation 514). The user may then modify the source files A1.src, A2.src further in an attempt to eliminate the errors.

If, instead, the tests executed in the validation environment 410, or some minimum set of the tests, were successful, the validation environment 410 may generate one or more new libraries (and possibly associated dependency metadata 418) (operation 516), and associate the new libraries with a new checkpoint. In the example of FIG. 5A, the validation environment 410 may combine the compiled code derived from the modified source files A1.src (MOD), A2.src (MOD) with the remaining binary code in the associated library A to generate a new version of the library A (labeled library A' in FIG. 5A) associated with a new checkpoint CP2. The validation environment 410 may then publish the new library A' (designated in FIG. 5A by way of vertical line segments associated with the new checkpoint CP2) to the binary repository 404 (operation 518). Also, the validation environment 410 may also publish new dependency metadata 418 and the new checkpoint CP2 to the dependency metadata system 408. In one example, the validation environment 410 may also inform the developer via the development environment 402 that the tests were successful, and that the new checkpoint CP2 was generated.

Figure 6:
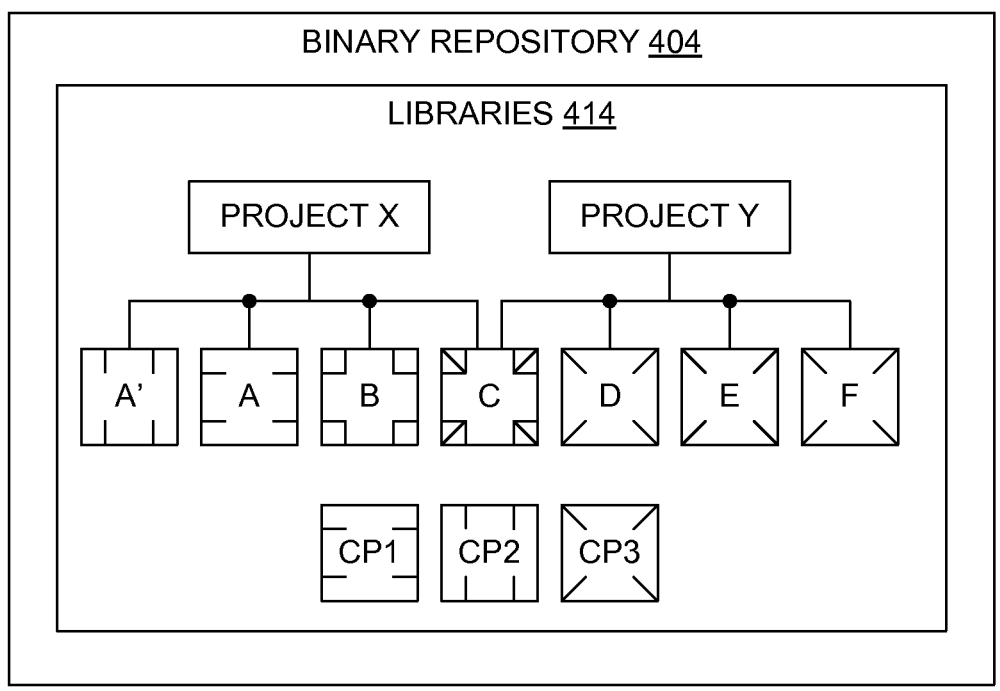
FIG. 6 is a graphical representation of the libraries in the binary repository after execution of the example method for software development depicted in FIGS. 4A, 4B, 5A, and 5B.

FIG. 6 illustrates an organization of the libraries 414 in the binary repository 404 according to one example. In reference to the example of FIGS. 5A and 5B, the validation environment 410 has published the new library A' associated with the new checkpoint CP2 to the repository 404, with the new library A' residing in the repository 404 with the previous version of the library A corresponding to the previous checkpoint CP1. Thus, depending upon which checkpoint is being requested, the development environment 402 may download the older library A (if checkpoint CP1 is desired), or the most recent library A' (if the new checkpoint CP2 is being requested).

Since multiple projects or applications may be serviced via the same binary repository 404, at least some of the libraries 414 of the repository 404 may be employed in more than one project. As depicted in FIG. 6, a hierarchical structure may be employed in the repository 404 such that a single library 414 may be associated with multiple projects, such as the library C being associated with both Project X and Project Y. Also indicated in FIG. 6 is that the library C may be associated with multiple checkpoints CP1 and CP2 (for Project X) and checkpoint CP3 (for Project Y). Similarly, library B is associated with both the first checkpoint CP1 and the new checkpoint CP2. FIG. 6 also depicts the two separate versions of the library A: the original library A associated with the previous checkpoint CP1, and the newer library A' corresponding to the new checkpoint CP2, so that the code associated with either checkpoint CP1, CP2 for Project X may be downloaded to the development environment 402 upon request of the developer. In some embodiments, the hierarchical organization of the binary repository 404 may be determined by way of directories, "folders," or other file organization structures.

At this point in the example, all of the code associated with the new checkpoint CP2 is incorporated into the libraries A', B, C corresponding to Project X, without the need for access to the source code 416 from the source control system 406, as was the case with the previous checkpoint CP1. As a result, in order to allow a developer to work with the code associated with the new checkpoint CP2, the development environment 402 may retrieve the new library A' (possibly in addition to libraries B, C, if not already downloaded to the development environment 402) based on the new checkpoint CP2, without the need for access to the source code 416 of the source control system 406 at that point. If the developer then desires to modify any of the libraries A', B, C associated with Project X, the development environment 402 may retrieve only the specific source code 416 from the source control system 406 associated with the library 414 to be modified to start the modification/build/validation process over again.

In some examples, instead of modifying preexisting source code 416, the developer may write new source code modules to be integrated within the current project. In this case, the development environment 402, under the direction of the developer, may update the dependency metadata 418 associated with the project to include the necessary references to the new source code 416. Once the developer completes the new source code 416 using the development environment 402, the new source code 416 may be forwarded to the validation environment 410, which may build and test the resulting project in a fashion similar to that described above. Presuming the tests complete successfully, the validation environment 410 may then incorporate the binary code associated with the new source code 416 into a preexisting or new library, and publish the library, along with a new checkpoint, to the binary repository 404 and the dependency metadata system 408.

As a result of at least some of the embodiments discussed herein, the amount of source code 416 that is retrieved from the source control system 406 and maintained in the development environment 402 is held at a reduced level throughout the development cycle of the project, and is frequently reduced to zero each time a new checkpoint is generated and published. Additionally, as the libraries 414 are more compact and space-efficient than their corresponding source code 416, the amount of data storage space included in each development environment 402 may be reduced compared to systems in which most or all of the source code 416 is stored in the development environment 402. Further, if a new project is generated from a checkpoint associated with a previous project, the new project may be initiated with none of the source code 416 of the previous project being downloaded to the development environment 402 at that time. As with ongoing projects, any changes made to the new project would only involve access to those source files that include any incremental changes desired by the developer at that point. Initiating a new project by leveraging the binary libraries 414 from a previous project thus accelerates the initial development of the new project, which can be one of the more difficult and time-consuming phases for any development team.

In some examples, each development checkpoint identifies its affiliated code version as being validated or verified for a particular feature, functionality, or level of performance, as determined by the validation environment, thus distinguishing that code version from other versions associated with other source code check-ins that were not validated successfully. Thus, each developer may use any of the checkpoints as a safe basis upon which to further modify and develop the application. Oppositely, the use by a developer of a code version that has not been validated, and thus not associated with a recent checkpoint, may cause any of a number of problems for the developer, such as compilation or linking errors, functionality problems, and reliability or performance issues.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations thereof. Example embodiments may be implemented using a computer program product (e.g., a computer program tangibly embodied in an information carrier in a machine-readable medium) for execution by, or to control the operation of, data processing apparatus (e.g., a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communications network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a field programmable gate array (FPGA) or an application-specific integrated circuit (ASIC)).

The computing system can include clients and servers. A client and server are generally remote from each other and typically interact through a communication network. The relationship of client and server arises by virtue of computer programs running on their respective computers and having a client-server relationship to each other. In embodiments deploying a programmable computing system, it will be appreciated that both hardware and software architectures may be considered. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set forth hardware (e.g., machine) and software architectures that may be deployed in various example embodiments.

Example Machine Architecture and Machine-Readable Medium

Figure 7:
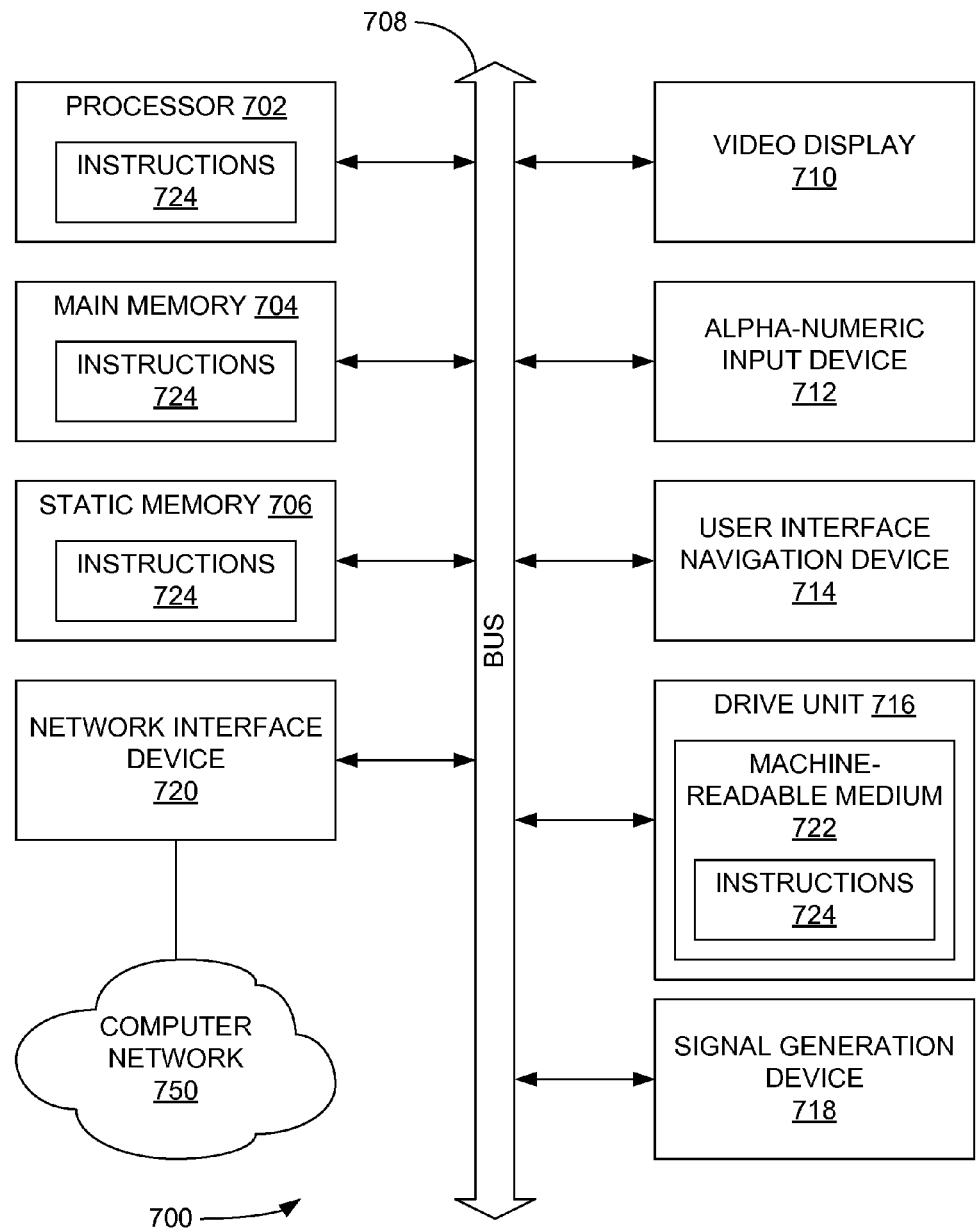
FIG. 7 is a diagrammatic representation of a machine in the example form of a computer system within which a set of instructions for causing the machine to perform any one or more of the methodologies discussed herein may be executed.

FIG. 7 is a block diagram of a machine in the example form of a computer system 700 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker), and a network interface device 720.

Machine-Readable Medium

The disk drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Transmission Medium

The instructions 724 may further be transmitted or received over a computer network 750 using a transmission medium. The instructions 724 may be transmitted using the network interface device 720 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

CONCLUSION

Thus, a method and system to facilitate incremental software development have been described. Although the present subject matter has been described with reference to specific example embodiments, it will be evident that various modifications and changes may be made to these embodiments without departing from the broader scope of the subject matter. For example, while the majority of the discussion above notes the use of the embodiments with respect to general-purpose computer systems and applications, other software- or firmware-based systems, such as electronic products and systems employing embedded firmware, may also be developed in a similar manner to that discussed herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. The Abstract is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
   storing, in a repository, a plurality of binary libraries, a set of binary libraries of the plurality of binary libraries being associated, via dependency metadata, with a checkpoint of a first project;
   generating a second project from the checkpoint of the first project;
   responsive to the generating of the second project, providing to a development environment, by a processor of a machine, the set of binary libraries associated with the checkpoint of the first project without providing source code;
   receiving a request to modify source code associated with a first binary library of the plurality of binary libraries;
   responsive to the request, providing the source code associated with the first binary library to the development environment;
   receiving, from the development environment, modified source code associated the first binary library;
   identifying a second binary library of the plurality of binary libraries based on dependency metadata of the second binary library that indicates a dependency of the second binary library on the modified source code;
   determining, based on the identification of the second binary library, that the modified source code necessitates a modification to the second binary library; and
   in response to the determination, providing the source code associated with the second binary library to the development environment.

2. The method of claim 1, wherein the checkpoint of the first project is associated with a particular feature, functionality, or performance level.

3. The method of claim 1, further comprising:
   in response to the determination, providing, by the development environment, a notification that the modified source code necessitates the modification to the second binary library.

4. The method of claim 3, wherein the notification is provided while a user is modifying the source code.

5. The method of claim 1, further comprising:
   compiling the modified source code to produce compiled source code;
   building a revised version of the second project using the compiled modified code and the plurality of binary libraries;
   testing the revised version of the second project; and
   based on results of the testing, updating dependency data for the second project.

6. A system comprising:
   a memory having instructions embodied thereon;
   one or more processors communicatively coupled to the memory and configured to, in response to executing the instructions, perform or control performance of operations, the operations comprising:
   storing, in a repository, a set of binary libraries being associated, via dependency metadata, with a checkpoint of a first project;
   generating a second project from the checkpoint of the first project;
   responsive to the generating of the second project, providing to a development environment the set of binary libraries associated with the checkpoint of the first project;
   receiving a request to modify source code associated with a first binary library of the set of binary libraries;
   providing the source code associated with the first binary library of the set of binary libraries to the development environment;
   receiving, from the development environment, modified source code for the first binary library;
   identifying a second binary library of the set of binary libraries based on dependency metadata of the second binary library that indicates a dependency of the second binary library on the modified source code; and
   providing source code associated with the second binary library of the set of binary libraries to the development environment in response to determining that the modified source code necessitates a modification to the second binary library.

7. The system of claim 6, wherein the checkpoint of the first project is associated with a particular feature, functionality, or performance level.

8. The system of claim 6, further comprising:
   compiling the modified source code to produce compiled source code;
   building a revised version of the second project using the compiled modified code and the set of binary libraries;
   testing the revised version of the second project; and
   based on results of the testing, updating dependency data for the second project.

9. The system of claim 6, further comprising:
   in response to the determination, providing, by the development environment, a notification that the modified source code necessitates the modification to the second binary library.

10. The system of claim 9, wherein the notification is provided while a user is modifying the source code.

11. A non-transitory machine-readable medium having instructions embodied thereon, which, when executed by one or more processors of a system, cause the system to perform or control performance of operations comprising:
    providing to a development environment a set of binary libraries;
    receiving a request to modify source code associated with a first binary library of the set of binary libraries;
    providing the source code associated with the first binary library of the set of binary libraries to the development environment;

receiving, from the development environment, modified source code for the first binary library;

identifying a second binary library of the set of binary libraries based on dependency metadata of the second binary library that indicates a dependency of the second binary library on the modified source code; and determining, based on the identification of the second binary library, that the modified source code necessitates a modification to the second binary library;

in response to the determination, providing, by the development environment, a notification that the modified source code necessitates the modification to the second binary library; and providing source code associated with the second binary library of the set of binary libraries to the development environment upon determining the source code associated with a first binary library has been modified, the second binary library being dependent on the first binary library.

12. The non-transitory machine-readable medium of claim 11, wherein the set of binary libraries is associated with a checkpoint of a project and the checkpoint of the project is associated with a particular feature, functionality, or performance level.

13. The non-transitory machine-readable medium of claim 11, further comprising:
compiling the modified source code to produce compiled source code;
building a revised version of a project using the compiled modified code and the set of binary libraries;
testing the revised version of the project; and
based on results of the testing, updating dependency data for the project.

* * * * *